June 16, 1925.
C. J. ROTTMANN
1,541,853
ABSORPTION BULB
Filed June 9, 1919
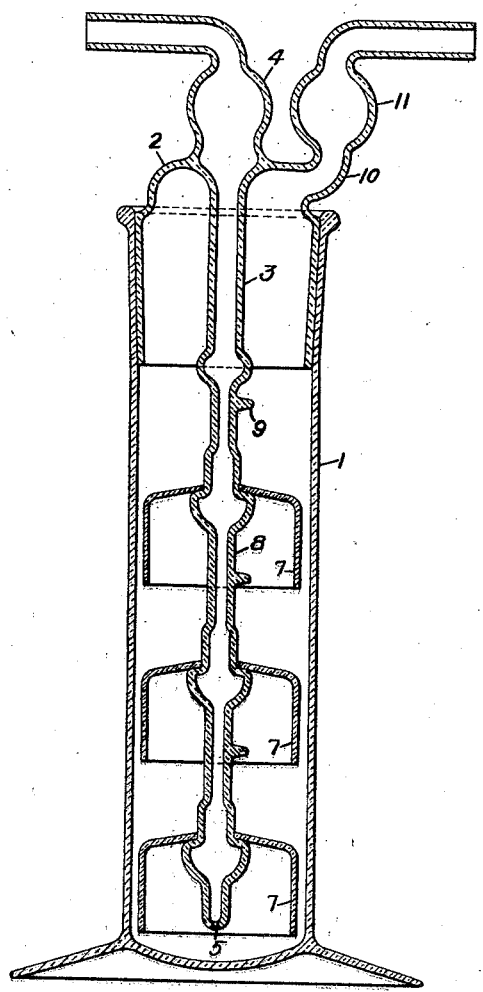
WITNESSES:
J. A. Helsel
W. W. Woodman.
INVENTOR
Clarence J. Rottmann.
BY
Wesley G. Carr
ATTORNEY Patented June 16, 1925.

1,541,853

UNITED STATES PATENT OFFICE.

CLARENCE J. ROTTMANN, OF WILKINSBURG, PENNSYLVANIA, ASSIGNOR TO WESTINGHOUSE ELECTRIC & MANUFACTURING COMPANY, A CORPORATION OF PENNSYLVANIA.

ABSORPTION BULB.

Application filed June 9, 1919. Serial No. 302,737.

*To all whom it may concern:*

Be it known that I, CLARENCE J. ROTTMANN, a citizen of the United States, and a resident of Wilkinsburg, in the county of Allegheny and State of Pennsylvania, have invented a new and useful Improvement in Absorption Bulbs, of which the following is a specification.

My invention relates to absorption bulbs for use in gas determinations and the like and it has, for one object, the construction of a bulb which will insure more complete absorption of a gas passed through it.

A still further object of my invention is to provide an absorption bulb which is not only unusually efficient but which is simple in design and stronger in construction than the bulbs now in use.

The single figure of the drawing is a longitudinal sectional view of a preferred embodiment of my invention.

While various changes in design, proportions and materials may be resorted to, my absorption bulb may preferably comprise a body 1 in the form of a glass cylinder slightly flared at its upper end to receive a closure or cap 2, the engaging surfaces of the cylinder and closure being preferably ground to provide a gas-tight joint. The enclosure is preferably of glass and, leading through it and preferably formed integrally with it, is the gas inlet or supply tube 3 which, immediately outside of the cap, may be formed with an enlargement or chamber 4 providing a trap for any vapors or splashing liquid tending to escape from the bulb. This inlet tube preferably extends to within a short distance of the bottom of the cylinder and is formed, at its end, with a reduced discharge passage or opening 5.

At spaced intervals throughout its length, the inlet tube is formed with a series of enlargements providing supporting shoulders for movable baffles 7 which may be in the form of inverted glass cups of slightly less external diameter than the internal diameter of the cylinder. These cups fit relatively closely about the tube immediately above the shoulders, while the tube below the shoulders is formed with reduced portions 8.

Projections or stops 9 are formed at spaced intervals on the tube to limit movement of the baffles, being so disposed that, as a baffle moves toward the one above, it will be stopped when it approximately reaches the latter baffle.

A gas-outlet tube 10 may lead from the closure 2, being preferably formed integrally with it and provided with an enlargement or chamber 11 providing a trap to catch any liquid which may be passing from the bulb with the escaping gases.

My absorption bulb may be employed in place of absorption bulbs now in use for any purposes for which such bulbs are suited, it being only necessary to partly fill it with an absorbing solution suitable for the particular gas to be absorbed. When employing the bulb, enough absorbing liquid is poured into it so that, when the closure and parts supported thereby are in place, the upper baffle will be somewhat below the liquid level in the cylinder.

My bulb is primarily intended for use in carbon-dioxid determinations and, when so employed, may be filled with a solution of caustic soda. The inlet tube 3 may be connected by a rubber tube or the like with the source of gas supply, while the outlet tube 10 may be connected with a bulb containing phosphorus pentoxid which will absorb any moisture.

The gas passing through the inlet tube 3 escapes through the small discharge opening 5 in a stream of small bubbles which are partially dissolved by the absorbing liquid. The unabsorbed gas is caught in the lowermost of the movable baffles or cups which soon becomes substantially full of gas that is momentarily retarded in its upward movement through the solution by the weight of the cup. When the cup is nearly filled, the buoyancy of the gas lifts the cup until it is stopped by the projection 9, the gas contained in the cup escaping through the space between the cup and the reduced portion of the tube and passing into the cup immediately above. The upper cups, of course, are operated in a similar manner by the passing gas so that the gas is greatly retarded in its upward movement by the cups which, being constantly wet with the absorbent solution and holding the gas under a slight pressure, insure excellent gas absorption. After the gas has passed through the bulb, the latter may be disconnected from the source of supply and the absorption bulb, together with the phosphorus pentoxid bulb, may then be weighed to permit calculation of the gas absorbed.

From the foregoing description, it will be apparent that my apparatus is unusually compact and easily handled so that the likelihood of errors occurring in weighing is reduced to a minimum. The bulb may easily contain a comparatively large amount of the absorbing solution so that sufficient solution for a good many runs may be placed in it at one time. Obviously, the closure and parts supported by it may be readily removed from the cylinder, and both the cylinder and the baffles and inlet tube may be easily cleaned.

I have found, by actual tests, that an absorption bulb constructed in accordance with my invention will insure effective absorption for gas flowing at as high a rate as 300 cc. per minute, and results indicate that its reliability, where absorption is slow, is 0.1 mg—0.002% carbon content in low-carbon ferro alloys.

As it is obvious that changes in details of construction and in the materials employed may be made without affecting the principle of operation of the bulb, no limitations are to be imposed upon my invention other than those indicated in the claims.

I claim as my invention:

1. An absorption bulb comprising a liquid container having a discharge opening, means for introducing a gas near the bottom of the container, and a plurality of movable baffle members disposed within the container to delay passage of the gas therethrough.

2. An absorption bulb comprising a container and closure therefor, discharge means leading from the closure, a gas-supply pipe leading through the closure, with one end disposed adjacent the bottom of the container, and baffle members carried by the supply pipe within the container.

3. An absorption bulb comprising a container and closure therefor, discharge means leading from the closure, a gas-supply pipe leading through the closure, with one end disposed adjacent the bottom of the container, and baffle members carried by the supply pipe within the container, the baffle members being mounted for limited vertical movement.

4. An absorption bulb comprising a container and closure therefor, discharge means leading from the closure, a gas-supply pipe leading through the closure, with one end disposed adjacent the bottom of the container, and a plurality of inverted, cup-shaped, baffle members mounted for limited vertical movement upon the inlet pipe within the container.

5. An absorption bulb comprising a cylinder, a closure therefor formed with an outlet passage, a gas-supply pipe leading through the closure and terminating at its lower end adjacent the bottom of the cylinder, a plurality of spaced stop elements projecting from the pipe within the cylinder, and baffle members mounted on the pipe and movable between the stop members.

6. An absorption bulb comprising a cylinder, a closure therefor formed with an outlet passage, a gas-supply pipe leading through the closure and terminating at its lower end adjacent the bottom of the cylinder, a plurality of spaced stop elements projecting from the pipe within the cylinder, and baffle members mounted on the pipe and movable between the stop members, the pipe being reduced in diameter below each stop member.

In testimony whereof, I have hereunto subscribed my name this 29th day of May, 1919.

CLARENCE J. ROTTMANN.